Oct. 19, 1954 W. RINKER 2,691,887
APPARATUS FOR DETERMINING THE CONTOUR
OF INTERIOR SURFACES OF WORKPIECES
Filed Nov. 16, 1951 2 Sheets-Sheet 1

INVENTOR.
Wilhelm Rinker
BY
Benj. T. Pauber
ATTORNEY

Patented Oct. 19, 1954

2,691,887

UNITED STATES PATENT OFFICE 2,691,887

APPARATUS FOR DETERMINING THE CONTOUR OF INTERIOR SURFACES OF WORKPIECES

Wilhelm Rinker, Wetzlar, Germany, assignor to Ernst Leitz, G. m. b. H., Wetzlar, Germany, a corporation of Germany Application November 16, 1951, Serial No. 256,694

2 Claims. (Cl. 73—105)

My present invention relates to apparatus for testing the contours of a surface, that is, the roughness or the presence of depressions or of raised portions in the interior surface of a work piece.

Testing apparatus for investigating the surfaces of work pieces have been known, whose testing or probing needle has been subjected to swinging so that the needle follows precisely the slightest unevenness of the surface as, for example, in German Patent No. 740,781. With the apparatus heretofore known the inner surfaces, for example, borings, of work pieces could not be tested. My invention relates to an apparatus which renders this possible.

In my invention a double arm lever is mounted by a weak spring as a fulcrum so that the resonance of swinging of the lever system lies below the frequency of an imposed swinging which is imparted to the system from a transmission pin set into vibration and joined to an end of the lever by a spring, preferably a leaf spring. The leaf spring which joins the transmission pin to the lever is rigid in the direction of transmission. At the other end of the lever is mounted a test probe or needle which probes the contour of the surface to be tested and whose deflection, dependent on the surface contour, is transmitted through the lever, the leaf spring and the transmission pin to an indicating apparatus.

The oscillation of the transmission pin is actuated in any suitable known manner, for example, electromechanically and is for this purpose above the resonant vibration of the lever system in order not to bring about a vibration of too great an amplitude by setting up resonance effects, which through the test probe would have a tendency to impair the surface being tested.

Figure 1:
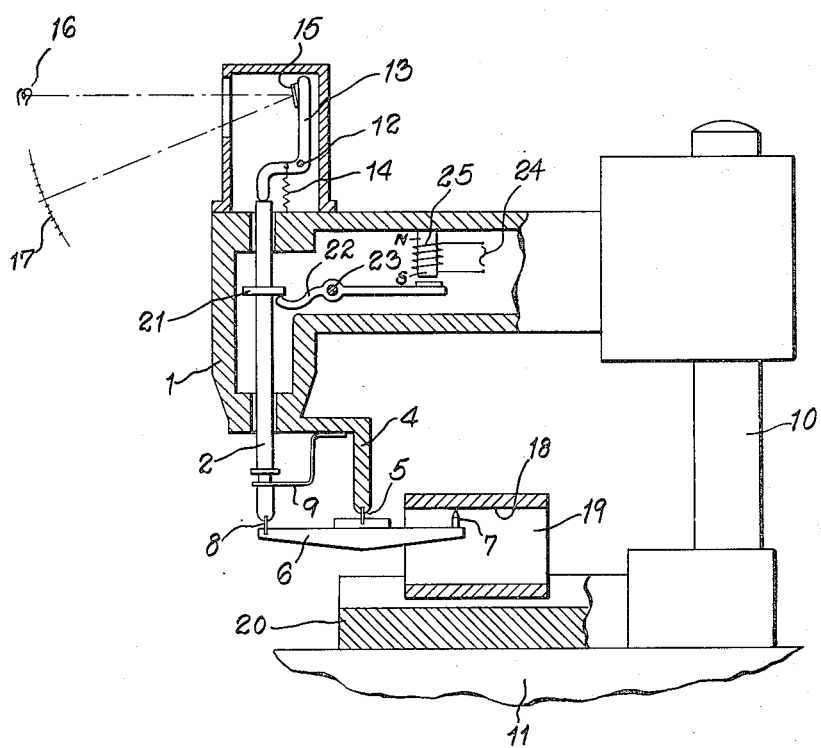
Figure 2:
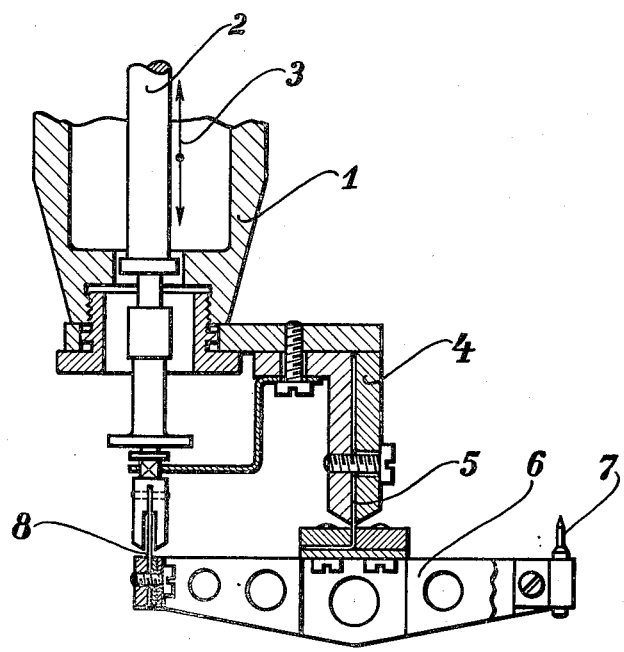

An embodiment of the invention is illustrated by way of example in the accompanying drawings, in which Fig. 1 is an elevation partly in section of apparatus embodying a preferred form of my invention, and, Fig. 2 is a vertical section on a larger scale of part of the apparatus of Fig. 1.

In the accompanying drawings there is shown by way of example an embodiment of the invention in which a head 1 of the surface contour testing apparatus is mounted on a pillar 10 mounted on a table 11. In the head 1 is a transmission pin 2 to one end of which a swinging lever 13 pivoted at 12 is positively and tensionally held by a tension spring 14. At the free end of the swinging lever 13 a mirror 15 is mounted which reflects light from a source 16 to a scale 17. An arm 4 is secured to the head 1 to whose free end is secured a weak leaf spring 5 which forms the fulcrum of a double arm lever 6. To one end of this lever 6 is secured a test probe 7 which probes the inner surface 18 of a tube 19 which is mounted on a control slide 20. The other end of the lever is joined with the transmission pin 2 by a leaf spring 8, the pin being guided by a holder 9. The transmission pin 2 has a collar 21 on which a double arm lever 22 acts, which lever is rockable about an axis 23 and set into vibration by an electromagnet 25, the core of which is a permanent magnet, in circuit with an alternating current source 24.

Upon passing an alternating current through the electromagnet 25 one end of the lever 22 is attracted in one phase so that the transmission pin 2 can sink until the test probe 7 rests on the surface 18. Correspondingly when this end of the swinging lever 13 sinks under the tension of the spring 14 the light source is reflected to a corresponding point on the scale 17 which corresponds with the position of rest of the test probe 7 on the surface 18. In the second phase of the alternating current the free end of the lever 22 falls away from the electromagnet 25 and the other end of the lever strikes upwardly on the collar 21 of the transmission pin 2 and lifts it and accordingly frees the test probe from the surface 18. The frequency of oscillation which is in this manner imposed on the transmission pin in the direction of the arrow 3 is equal to the frequency of the alternating current while the natural resonant swinging of the lever system 6 is essentially lower.

The permanent magnet core of the electromagnet has a north pole and a south pole, for example, the upper pole being north and the lower pole being south. The alternating current supplied from the alternating source 24 reinforces the polarity when the current is passing in one direction and nullifies it when the current is passing in the opposite direction to provide cycles in which the magnet attracts and releases the lever 22. The same result could be obtained by means of a rectifier in one of the leads to the electromagnet.

The apparatus of the above invention is particularly suited for use as a surface tester of the described type as well as for interior testing of all kinds.

Having described my invention, what I claim is:

1. Apparatus for testing surfaces which comprises a double arm lever, a leaf spring fulcrum for said lever, a test probe mounted on one end of said lever, a leaf spring mounted on the other end of said lever and extending in the direction of movement of said end about the fulcrum of said lever, a transmission pin secured to said leaf spring in alignment therewith, means to oscillate said transmission pin longitudinally with a frequency independent of that of said double arm lever, and means responsive to movement of said transmission pin to indicate the amplitude of oscillation thereof.

2. The apparatus of claim 1 in which said means for indicating the amplitude of oscillation of said transmission pin comprises a light source, a scale, and a mirror tiltable by said transmission pin to reflect light from said source onto said scale.

References Cited in the file of this patent

UNITED STATES PATENTS

| Number | Name | Date |
|---|---|---|
| 2,396,383 | Moore | Mar. 12, 1946 |

FOREIGN PATENTS

| Number | Country | Date |
|---|---|---|
| 118,097 | Australia | July 3, 1942 |

OTHER REFERENCES

Methods of Measurement and Definition of Surfaces, H. Becker in Microtecnic, vol. IV, No. 6, pp. 302–307, November-December 1950.